United States Patent

[11] 3,590,561

| [72] | Inventor | Robert I. Marble<br>Gardena, Calif. |
|---|---|---|
| [21] | Appl. No. | 771,117 |
| [22] | Filed | Oct. 28, 1968 |
| [45] | Patented | July 6, 1971 |
| [73] | Assignee | Farr Company<br>El Segundo, Calif. |

[54] GAS FILTER
2 Claims, 6 Drawing Figs.

[52] U.S. Cl. .................................................. 55/484, 55/515
[51] Int. Cl. .................................................. B01d 29/08
[50] Field of Search ........................................... 55/387–389, 497—500, 521, 515, 482—484; 210/284, 344

[56] References Cited
UNITED STATES PATENTS

| 1,728,568 | 9/1929 | Kriner | 210/284 |
|---|---|---|---|
| 3,243,942 | 4/1966 | Burke | 55/387 |
| 3,350,860 | 11/1967 | Grassel et al. | 55/387 |
| 3,350,861 | 11/1967 | Murphy, Jr. | 55/521 |
| 3,402,531 | 9/1968 | Farr | 55/484 |
| 3,411,273 | 11/1968 | Duncan et al. | 55/484 |
| 2,055,774 | 9/1936 | Ray | 55/484 |
| 3,186,149 | 6/1965 | Ayers | 55/484 |
| 2,334,802 | 11/1943 | Zuckermann | 210/284 |
| 2,737,258 | 3/1956 | Harlow | 55/154 |

FOREIGN PATENTS

| 737,665 | 9/1935 | Great Britain | 55/387 |
|---|---|---|---|

*Primary Examiner*—Frank W. Lutter
*Assistant Examiner*—Bernard Nozick
*Attorney*—Lyon and Lyon ABSTRACT: A gas filter formed of sets of similar sheet metal trays which, when stacked, form a plurality of inlet plenums having inlets at one side of the stack, an interposed set of outlet plenums having outlets at the opposite side of the stack, and sets of filter units between the inlet and outlet plenums.

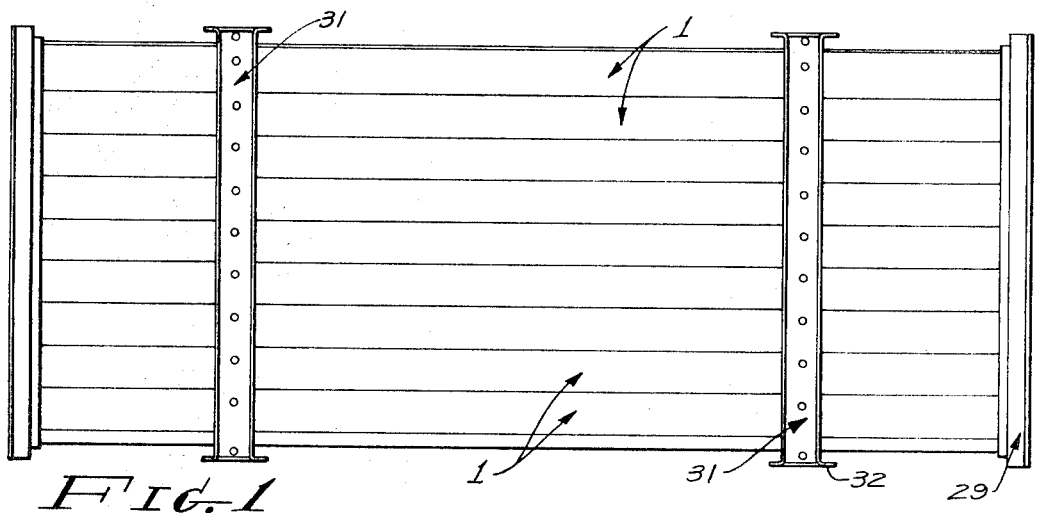
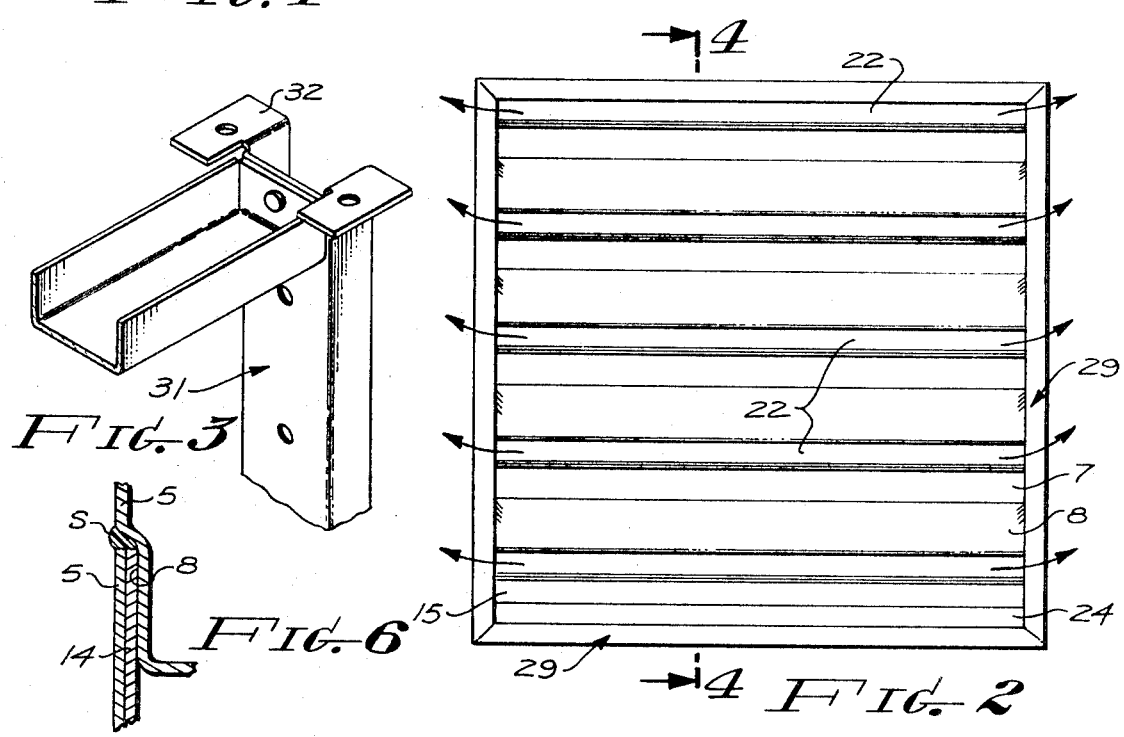
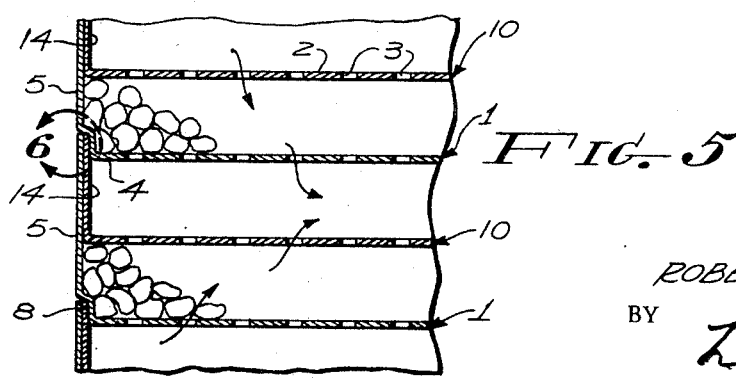

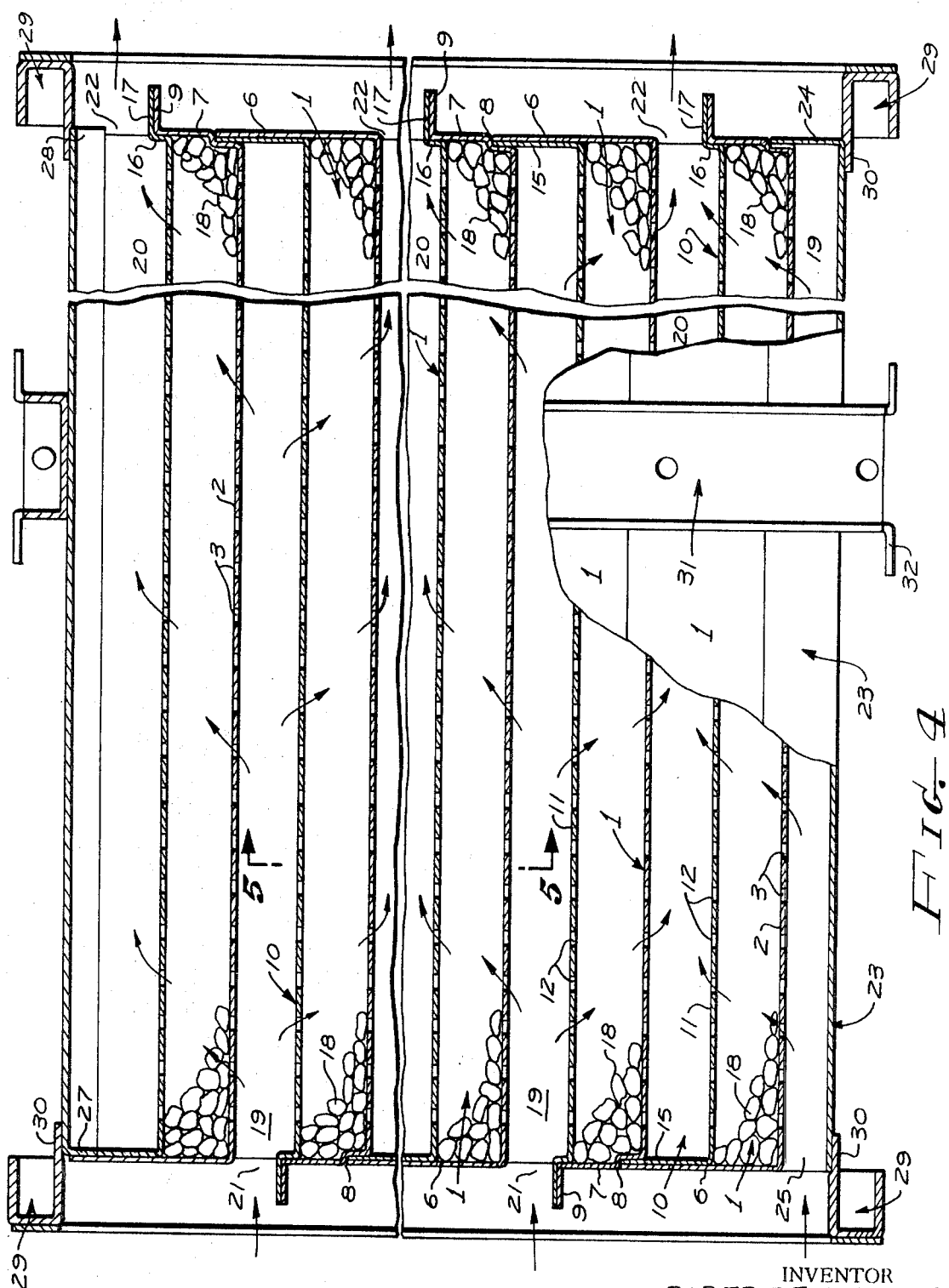

3,590,561

1

GAS FILTER

SUMMARY OF THE INVENTION

This invention relates to gas filters; that is, to filters which not only remove particulate matter from air or other gases, but also remove by absorption or adsorption, selected chemicals from the gas, and included in the objects of this invention are:

First, to provide a gas filter comprising identical units arranged in a stack, each unit having a horizontal inlet plenum and a vertically offset horizontal outlet plenum with a horizontal filter cell material therebetween.

Second, to provide a gas filter of this type in which one set of identical perforated trays is stacked so that the trays are disposed alternately so as to face endwise in opposite directions and are separated by members of a second set of identical perforated trays to form a stack of filter cells separated by inlet and outlet plenums.

Third, to provide a gas filter of this type in which the tray sets may be merely stacked or secured by separable fasteners for ready separation to change or clean the filter media, or permanently secured together depending upon the intended use.

Fourth, to provide a gas filter in which all the gas is forced through the filter cells; that is, none of the gas bypasses the filter cells; furthermore, the flow path through the filter cell is essentially the same for all the gas so as to effect uniform filtering of the gas.

Fifth, to provide a gas filter which without change in construction may be provided with as many filter cells as desired to accommodate any required gas flow, or separate filters may be positioned side-by-side or otherwise arranged to accommodate the required gas flow.

DESCRIPTION OF THE FIGURES

FIG. 1 is a side view of the assembled gas filter.

FIG. 2 is an enlarged view, showing the outlet end of the gas filter.

FIG. 3 is a fragmentary perspective view, showing one of the retaining frames.

FIG. 4 is an enlarged fragmentary longitudinal sectional view, taken through 4—4 of FIG. 2, the portion shown in elevation.

FIG. 5 is an enlarged fragmentary sectional view, taken through 5—5 of FIG. 4.

FIG. 6 is an enlarged fragmentary sectional view, taken within Circle 6 of FIG. 5.

The gas filter includes a set of container trays 1, formed of sheet metal. Each container tray includes a bottom plate 2, having a uniform distribution of perforations 3 which terminate short of the edges of the plate to form an unperforated margin 4. The plate 2 is rectangular and is joined to a pair of sidewalls 5 and an end wall 6, all of the same height, which constitute spacer or major walls. The remaining end wall of the plate is provided with a minor wall 7; that is, a wall of lesser height than the major walls constituting the other end wall and the sidewalls. The bottom portion of the minor end walls 7 as well as the side walls 5 is provided with a joggle or offset 8 equal to the thickness of the metal forming these walls. The minor end wall is provided with an outwardly directed horizontal flange 9.

A set of cover trays 10, one for each container tray 1, is provided. Each cover tray includes a rectangular plate 11, having perforations 12, and provided with an unperforated margin, similar to the bottom plate 2 of the container tray. Each plate 11 is provided with sidewalls 14 and an end wall 15 which form spacer or major walls which fit within the sidewalls 5 and the end wall 6 of the container tray and extend into the offset 8. The remaining end of the plate 11 is provided with a shallow or minor end wall 16 joined to a horizontally outwardly extending end flange 17.

Each cover tray is dimensioned so that its sidewalls and end walls fit within a corresponding container tray 1, to place the perforated plate 11 in parallel relation with the perforated bottom plate 2. The end flange 17 overlaps the end flange 9. If desired, the side walls 14 and end wall 15 may be secured within the corresponding sidewalls 5 and end wall 6 with any suitable fastening means, not shown, or by welding the like.

Each container tray 1 and its cover plate 2 form a filter unit, and the space between the perforated plates 2 and 11 form a filter cell which is filled with a filter media 18, for example, but not limited to, activated charcoal.

The filter units are stacked one on top of the other and are turned alternately end-for-end. When thus stacked, the joggle or offset 8 of an upper container tray rests on the upper edges of the sidewalls 5 and 14 and end walls 6 and 15 of the next lower container tray, and cover tray. Once in place, the overlapping margins of adjacent filter units may be spot welded or, as shown in FIG. 6, the trays may be sealed by filling the space formed between the shoulder formed by the offset 8 and the confronting edges of the side and end walls 5, 14, 6 and 15 with a plastic sealant S. In situations where some leakage is permitted, the trays may remain unfastened so that the trays may be separated when desired.

When the filter units are stacked, the filter cells are spaced apart and the intervening space forms either an inlet plenum 19 or an outlet plenum 20, having oppositely facing inlet openings 21 and outlet openings 22, respectively; that is, the inlet openings face in one direction at one end of the gas filter and the outlet openings face in the opposite direction at the opposite end of the filter.

In order to complete the filter, the bottom filter unit rests on a bottom tray 23, having a pair of sidewalls and an end wall 24 and an open end 25. In the construction illustrated in FIG. 4, the bottom tray 23 forms with the adjacent filter unit an inlet plenum accessible through the open end 25.

The top filter unit is covered by a top tray 26, also having side and end walls 27, and an open end 28. In this case, the top tray forms with the uppermost filter unit, an outlet plenum communicating through the open end 28.

The stack of filter units, each comprising a container tray 1 and cover tray 10, are secured in their stacked condition by a pair of rectangular end frames 29, preferably channel shaped in cross section with the flanges of the channel extending horizontally, and one flange extending further than the other to form a lip 30 surrounding the stack of filter units. In addition to the end frames 29, the filter may be provided with one or more intermediate frames 31 which may be formed of channel members joined together. The vertical ends of the intermediate frames 31 may have mounting flanges 32 so that several filters may be stacked. In addition, these filters may be mounted side-by-side. still further, the number of filter units in each filter may be changed to meet different capacity requirements.

Operation of the gas filter is as follows:

The gas to be filtered flows in parallel streams into the set of inlet openings 21, as well as the open end 25, and is distributed in the corresponding inlet plenums 19. The gas passes from each plenum into the two adjacent filter units and then into the two outlet plenums 20 on the far sides of the two filter units and discharge through the outlet openings 22. The gas received in each outlet plenum comes from two adjacent filter units, thus the flow in the inlet plenums and in the outlet plenums are equal. Furthermore, the flow through the filter cells tends to be relatively uniform throughout the area of the cell; that is, the relatively constant flow path is established throughout the filter cell.

While particular embodiments of this invention have been shown and described, it is not intended to limit the same to the details of the constructions set forth, but instead, the invention embraces such changes, modifications and equivalents of the various parts and their relationships as come within the purview of the appended claims.

I claim:

1. A gas filter, comprising:

a. a set of rectangular container trays formed of sheet metal material, each including a perforated bottom plate bordered on three sides by imperforate upwardly directed major walls of the same height and the fourth side by an imperforate upwardly directed minor wall of less height than its major walls;
b. a set of rectangular cover trays formed of sheet metal material, each including a perforated bottom plate bordered on three sides by imperforate upwardly directed major walls of the same height and on the fourth side by an imperforate upwardly directed minor wall of less height than its major walls;
c. all of the major and minor walls of each cover tray nesting within the corresponding major and minor walls of a corresponding container tray and substantially flush therewith at their upper edges; said container and cover trays forming a filter unit defining a filter cell between their perforated plates;
d. said filter units being stacked in end-for-end reversal wherein the minor walls of the container and cover trays forming a lower filter underlie a major wall of the filter unit next above;
e. the lower portions of said minor wall and adjacent major walls of each upper filter unit being inwardly offset to nest within the major walls of the cover tray of each filter unit next below and defining a shoulder seated on the flush upper edges of the major walls of the unit next below;
f. means sealing the junctures between said shoulders and the contiguous upper edges of the major walls of the unit next below;
g. adjacent filter units forming therebetween plenums closed and sealed on three sides and open above the minor wall side of the lower filter unit, the open ends of adjacent plenums facing in opposite directions to form a set of inlet openings and a set of outlet openings separated by the filter cells;
h. and a filter medium filling each cell.

2. A gas filter, as defined in claim 1, wherein:
a. the upper portions of the minor walls of the container and cover tray of each filter unit are folded outwardly in contiguous relation.